US012774937B2

(12) United States Patent
Makigano et al.

(10) Patent No.: US 12,774,937 B2
(45) Date of Patent: Oct. 27, 2026

(54) COMPONENT INSPECTION METHOD, COMPONENT MANUFACTURING METHOD, AND COMPONENT INSPECTION DEVICE

(71) Applicant: MITSUBISHI HEAVY INDUSTRIES, LTD., Tokyo (JP)

(72) Inventors: Hiroshi Makigano, Tokyo (JP); Ryuta Ito, Tokyo (JP); Atsuya Sakata, Tokyo (JP); Taro Tokutake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 297 days.

(21) Appl. No.: 18/706,233

(22) PCT Filed: Oct. 6, 2022

(86) PCT No.: PCT/JP2022/037438
§ 371 (c)(1),
(2) Date: Apr. 30, 2024

(87) PCT Pub. No.: WO2023/084958
PCT Pub. Date: May 19, 2023

(65) Prior Publication Data

US 2024/0344929 A1 Oct. 17, 2024

(30) Foreign Application Priority Data

Nov. 15, 2021 (JP) ................................ 2021-185755

(51) Int. Cl.
*G01M 3/00* (2006.01)
*F01D 5/18* (2006.01)
(Continued)

(52) U.S. Cl.
CPC ............ *G01M 13/02* (2013.01); *G01J 5/485* (2022.01); *G01M 99/002* (2013.01)

(58) Field of Classification Search
CPC .......... G01M 3/00; G01M 3/02; G01M 3/025; G01M 3/04; G01M 13/00; G01M 13/02;
(Continued)

(56) References Cited

U.S. PATENT DOCUMENTS 4,644,162 A 2/1987 Bantel et al.
5,111,046 A 5/1992 Bantel
(Continued)

FOREIGN PATENT DOCUMENTS

DE 19720461 A1 * 2/1998 ............ G01N 25/72
DE 10 2009 039 224 3/2011
(Continued)

OTHER PUBLICATIONS

Machine Translation of DE-19720461-A1 (Year: 1998).*
(Continued)

*Primary Examiner* — Nguyen Q. Ha
(74) *Attorney, Agent, or Firm* — Wenderoth, Lind & Ponack, L.L.P.

(57) ABSTRACT

A component inspection method includes: supplying a fluid to a cooling flow passage of a component internally including the cooling flow passage; heating a surface of the component; and measuring a temperature of the surface of the component which has been heated.

10 Claims, 5 Drawing Sheets

(51) Int. Cl.

| | |
|---|---|
| ***G01J 5/48*** | (2022.01) |
| ***G01M 13/00*** | (2019.01) |
| ***G01M 13/02*** | (2019.01) |
| ***G01M 99/00*** | (2011.01) |

(58) Field of Classification Search

CPC .... G01M 15/14; G01M 99/00; G01M 99/002; G01N 21/00; G01N 21/35; G01N 21/88; G01N 21/8806; G01N 21/954; G01N 21/956; G01N 21/95692; G01N 25/72; G01J 5/485; G01K 13/02; F01D 21/00; F01D 21/003; F01D 2260/80; F01D 2270/8041

See application file for complete search history.

(56) References Cited

U.S. PATENT DOCUMENTS

| | | | | |
|---|---|---|---|---|
| 6,153,889 | A * | 11/2000 | Jones | G01N 25/72 250/559.46 |
| 7,671,338 | B2 * | 3/2010 | Key | G01M 3/002 250/340 |
| 10,048,133 | B2 * | 8/2018 | Smith | G01J 5/0088 |
| 2003/0055594 | A1 | 3/2003 | Bunker et al. | |
| 2013/0026365 | A1 | 1/2013 | Jahnke et al. | |
| 2013/0041614 | A1 | 2/2013 | Shepard et al. | |
| 2013/0181134 | A1 | 7/2013 | Forster | |
| 2014/0267694 | A1 | 9/2014 | Henderkott | |
| 2018/0321140 | A1 | 11/2018 | Boudin et al. | |
| 2021/0102859 | A1 * | 4/2021 | Koonankeil | F01D 5/186 |
| 2021/0208091 | A1 * | 7/2021 | Villette | G01N 25/72 |

FOREIGN PATENT DOCUMENTS

| | | | | |
|---|---|---|---|---|
| EP | 2339333 | B1 * | 7/2019 | G01M 99/002 |
| JP | 61-89506 | | 5/1986 | |
| JP | 2000-35371 | | 2/2000 | |
| JP | 2013-535000 | | 9/2013 | |
| JP | 2013-545003 | | 12/2013 | |
| JP | 2020-518827 | | 6/2020 | |
| WO | 2011/156040 | | 12/2011 | |

OTHER PUBLICATIONS

International Search Report issued Dec. 13, 2022 in International (PCT) Application No. PCT/JP2022/037438, with English-language Translation.

Written Opinion Of The International Searching Authority issued Dec. 13, 2022 in International (PCT) Application No. PCT/JP2022/037438, with English-language Translation.

Toyoaki Yoshida et al., “Surface Temperature Measurements with Infrared Camera”,Flow Visualization, vol. 2, No. 5, Apr. 1982, pp. 382-390, with English Abstract.

Inagaki Terumi, “Heat Transfer Measurement and Nondestructive Diagnosis Using Thermography”, Heat transfer J.HTSJ, vol. 54, No. 228, Jul. 2015, pp. 21-26.

Hajime Nakamura, “Temperature Measurement Using Infrared Thermography and its Application to Convective heat transfer measurement”, Heat transfer, J.HTSJ, vol. 54, No. 228, Jul. 2015, pp. 47-54.

* cited by examiner

COMPONENT INSPECTION METHOD, COMPONENT MANUFACTURING METHOD, AND COMPONENT INSPECTION DEVICE

CROSS-REFERENCE TO RELATED APPLICATION

The present application claims priority based on Japanese Patent Application No. 2021-185755 filed on Nov. 15, 2021.

TECHNICAL FIELD

The present disclosure relates to a component inspection method, a component manufacturing method, and a component inspection device.

BACKGROUND ART

For example, PTL 1 discloses a technique in which a turbine component can be heated by irradiating a surface of the turbine component (hereinafter, referred to as a component) with an optical pulse, and an anomaly (defect) on an extreme surface can be found from a temperature response caused by the heating.

CITATION LIST

Patent Literature

[PTL 1] PCT Japanese Translation Patent Publication No. 2020-518827

SUMMARY OF INVENTION

Technical Problem

The technique described in PTL 1 has a problem in that it is difficult to find an anomaly in a case where there is an anomaly in a cooling flow passage, which is formed inside a component through which a fluid for cooling the component flows.

The present disclosure has been made in order to solve the above problems, and an object of the present disclosure is to provide a component inspection method, a component manufacturing method, and a component inspection device capable of finding an anomaly in a cooling flow passage formed inside a component.

Solution to Problem

In order to solve the above problems, the component inspection method according to the present disclosure includes a fluid supply step of supplying a fluid to a cooling flow passage of a component having the cooling flow passage therein, a heating step of heating a surface of the component, and a measurement step of measuring a temperature on the surface of the component heated in the heating step.

In addition, a component manufacturing method according to the present disclosure includes a manufacturing step of manufacturing a component having a cooling flow passage therein, and the component inspection method for inspecting the component manufactured in the manufacturing step.

In addition, a component inspection device according to the present disclosure includes a fluid supply unit that supplies a fluid to a cooling flow passage of a component having the cooling flow passage therein, a heating unit that heats a surface of the component, and a measurement unit that measures a temperature on the surface of the component heated by the heating unit.

Advantageous Effects of Invention

According to the present disclosure, it is possible to provide a component inspection method, a component manufacturing method, and a component inspection device capable of finding an anomaly in a cooling flow passage formed inside a component.

DESCRIPTION OF EMBODIMENTS

Hereinafter, a component inspection device according to an embodiment of the present disclosure will be described with reference to the drawings.

(Inspection Device)

An inspection device is a device for finding an anomaly that has occurred in a cooling flow passage, which is formed in a component (specimen), through which a fluid for cooling the component flows. The component in the present embodiment is a high-temperature component for a gas turbine included in the gas turbine.

Examples of the high-temperature component for a gas turbine include a turbine vane (a stator vane or a rotor vane), a ring segment, a heat shield ring, and the like. In the present embodiment, the ring segment will be described as an example of the high-temperature component for a gas turbine.

Figure 1:
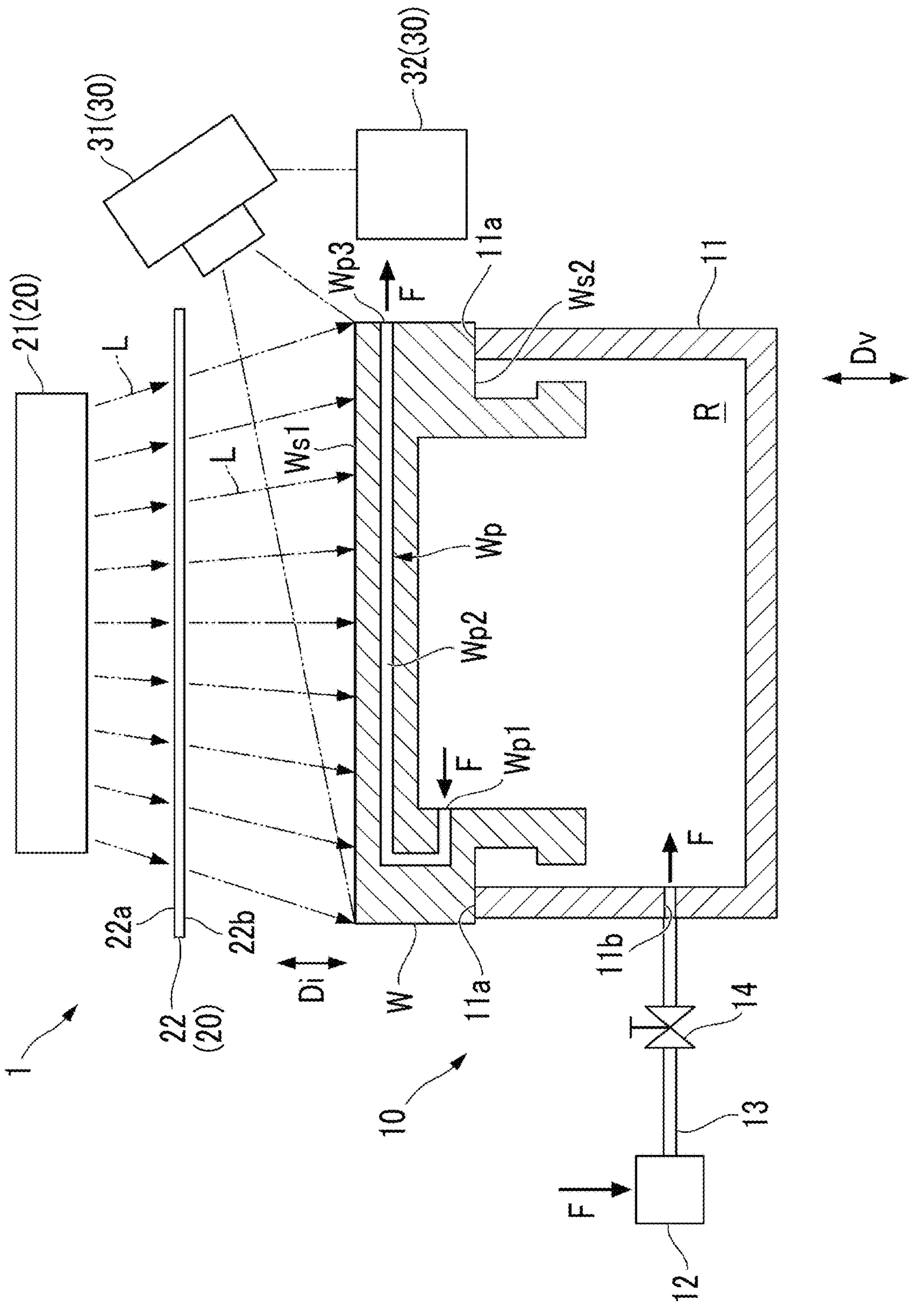
FIG. 1 is a schematic diagram showing a configuration of a component inspection device according to an embodiment of the present disclosure.

As shown in FIG. 1, the inspection device 1 includes a fluid supply unit 10, a heating unit 20, and a measurement unit 30.

(Fluid Supply Unit)

The fluid supply unit 10 supplies a fluid F to a cooling flow passage Wp, which is formed inside component W, for cooling the component W. For example, air is adopted as the fluid F in the present embodiment. The fluid supply unit 10 includes a chamber 11, a compressor 12, a supply line 13, and a valve 14.

(Chamber)

The chamber 11 is a processing chamber for supplying the fluid F to the component W. The component W is placed on and fixed to the chamber 11. That is, the chamber 11 supports the component W from below (lower side in a vertical direction Dv). The chamber 11 has a box shape that does not have a ceiling portion. That is, the chamber 11 has an opening portion that opens upward (upper side in the vertical direction Dv).

The vertical direction Dv (the vertical direction in FIG. 1) in the present embodiment is a direction that coincides with to a gravity direction. The opening portion of the chamber 11 facing the upper side in the vertical direction Dv is a component support portion 11*a* that supports the component W. The component W is placed on the component support portion 11*a*, so that a space is formed between the chamber 11 and the component W.

Here, the component W faces the upper side in the vertical direction Dv when the component W is placed on the chamber 11, and also has a surface Ws1 (inspection surface) to be inspected by an inspection device 1 and a non-inspection surface Ws2 which is located on the lower side in the vertical direction Dv with respect to the surface Ws1 and which is supported by the component support portion 11*a* of the chamber 11. The surface Ws1 and the non-inspection surface Ws2 form an outer shell of the component W, and the non-inspection surface Ws2 is connected to the surface Ws1.

A part of the non-inspection surface Ws2 of the component W comes into contact with the component support portion 11*a* of the chamber 11, so that the non-inspection surface Ws2 of the component W and an inner surface of the chamber 11 form a space airtightly isolated from the atmosphere. In the present embodiment, this space is referred to as a supply space R. The supply space R is a space for temporarily storing the cooling fluid F in a state of a positive pressure (pressure higher than an atmospheric pressure) in order to supply the fluid F to the cooling flow passage Wp of the component W.

The chamber 11 is formed with a hole portion 11*b* that penetrates the chamber 11 from the outside to the inside. Through the hole portion 11*b*, the cooling fluid F is introduced into the supply space R from the outside of the chamber 11.

Here, the component W has inside thereof a plurality of cooling flow passages Wp that extend in a horizontal direction through which the cooling fluid F can flow. The plurality of cooling flow passages Wp in the present embodiment are arranged at equal intervals in the horizontal direction. The cooling flow passage Wp has a fluid inlet portion Wp1 that opens into the supply space R, an intermediate portion Wp2 through which the fluid F flowing from the fluid inlet portion Wp1 flows, and a fluid outlet portion Wp3 that opens to the atmosphere and that is capable of discharging the fluid F which passes through the intermediate portion Wp2 to the atmosphere.

(Compressor)

The compressor 12 is a device that compresses a fluid F sucked from the outside to increase the pressure of the fluid F to a predetermined pressure, and also pumps the fluid F with increased pressure into the supply space R in the chamber 11.

(Supply Line)

The supply line 13 is a pipe that connects the chamber 11 and the compressor 12, and through which the fluid F flows. The cooling fluid F is introduced from the compressor 12 into the supply space R through the supply line 13.

(Valve)

The valve 14 is a valve body for adjusting the pressure of the fluid F flowing in the supply line 13 from the compressor 12 toward the chamber 11. The valve 14 is provided in the middle of the supply line 13.

Therefore, the fluid F supplied from the compressor 12 into the supply space R through the supply line 13 flows into the intermediate portion Wp2 through the fluid inlet portion Wp1 of the cooling flow passage Wp in the component W. The fluid F that has flowed into the intermediate portion Wp2 of the cooling flow passage Wp flows through the intermediate portion Wp2 to cool the component W, and then is discharged to the atmosphere through the fluid outlet portion Wp3.

(Heating Unit)

The heating unit 20 heats the surface Ws1 of the component W placed on the chamber 11 of the fluid supply unit 10.

The heating unit 20 includes a heating lamp 21 and a filter 22.

(Heating Lamp)

Figure 2:
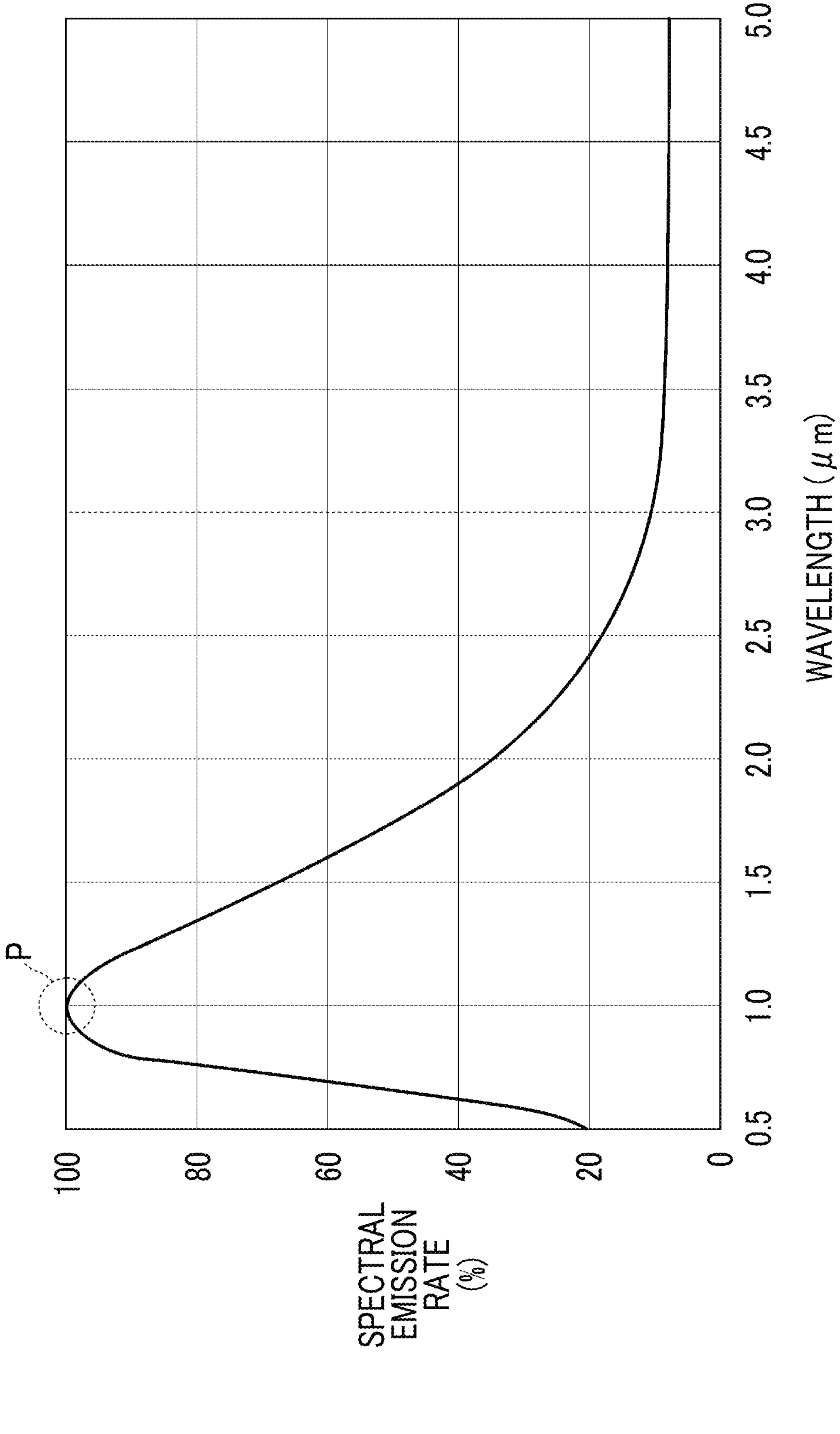
FIG. 2 is a graph showing a relationship between a wavelength of irradiation light to be emitted from a heating lamp according to the embodiment of the present disclosure and a spectral emission rate (spectral energy).

The heating lamp 21 is a halogen lamp capable of irradiating the surface Ws1 of the component W with an irradiation light L having a specific spectral distribution. The spectral distribution of the irradiation light L emitted by the heating lamp 21 in the present embodiment exhibits a property that a spectral emission rate (%) peaks at a specific wavelength (μm). As shown in FIG. 2, the irradiation light L in the present embodiment has a peak P of the spectral emission rate (spectral energy) in a wavelength band in the vicinity of 1.0 μm.

The heating lamp 21 in the present embodiment is disposed above the surface Ws1 of the component W in the vertical direction Dv. Hereinafter, a direction in which the heating lamp 21 irradiates toward the surface Ws1 of the component W is referred to as "irradiation direction Di". Therefore, one side of the irradiation direction Di is the direction from the heating lamp 21 toward the surface Ws1 of the component W, and the other side of the irradiation direction Di is a direction from the surface Ws1 of the component W on the side opposite to the one side of the irradiation direction Di toward the heating lamp 21. The irradiation direction Di in the present embodiment coincides with the vertical direction Dv.

(Filter)

The filter 22 is quartz glass (molten quartz) that does not transmit (cut) light in a specific wavelength band. The filter 22 is formed of quartz ($SiO_2$). The filter 22 in the present embodiment has a property of not transmitting the irradiation light L having a wavelength component of 3.0 μm or more among the irradiation light L that the heating lamp 21 irradiates to the surface Ws1 of the component W.

The filter 22 is disposed between the surface Ws1 of the component W and the heating lamp 21 so as to cover the surface Ws1 of the component W from above in the vertical direction Dv. That is, the filter 22 is interposed between the heating lamp 21 and the component W in the irradiation direction Di. The filter 22 has a flat plate shape, and has a first surface 22*a* facing an upper side (heating lamp 21 side) in the vertical direction Dv and a second surface 22*b* facing a lower side (component W side) in the vertical direction Dv, which is a side opposite to the first surface 22*a*.

Areas of the first surface 22*a* and the second surface 22*b* of the filter 22 are formed to be larger than an area of the surface Ws1 of the component W. A thickness of the filter 22 in the vertical direction Dv is set to 15 mm to 30 mm. As a result, the filter 22 can cut only an irradiation light component in the above-mentioned wavelength band from the irradiation light L incident from the first surface 22*a*, and can emit the irradiation light L that has cut the irradiation light component in the above-mentioned wavelength band from the second surface 22*b* to the surface Ws1.

(Measurement Unit)

The measurement unit 30 measures the temperature on the surface Ws1 of the component W heated by the heating unit 20.

The measurement unit 30 includes an infrared camera 31 and a measurement device 32.

(Infrared Camera)

The infrared camera 31 images light in a specific wavelength band. The infrared camera 31 in the present embodiment can receive light in a wavelength band of 3.0 μm to 17 μm and perform imaging (image processing). Therefore, a wavelength bandwidth to be detected by the infrared camera 31 in the present embodiment is larger than a wavelength at which the spectral energy of the irradiation light L of the heating lamp 21 peaks.

The infrared camera 31 is disposed such that the surface Ws1 of the component W can be included within an angle of view (within an imaging range). Therefore, the infrared camera 31 receives infrared rays (light) emitted from the surface Ws1 of the component W, and thus can acquire a temperature distribution image showing a temperature distribution of the surface Ws1 as data.

(Measurement Device)

The measurement device 32 is a device that acquires the temperature distribution image acquired by the infrared camera 31 imaging the surface Ws1 of the component W from the infrared camera 31, and determines whether or not the temperature distribution image has an anomaly. The measurement device 32 is connected to the infrared camera 31 via a cable or the like.

Here, a hump-shaped polyp or the like may be generated in the cooling flow passage Wp of the component W, and a part or the whole of one cooling flow passage Wp may be blocked by the polyp. The anomaly in the present embodiment means a base point (starting point) of a disturbance of the temperature distribution in the temperature distribution image caused by the polyp. In other words, the anomaly in the temperature distribution image indicates a generating location (generating position) of the polyp in the cooling flow passage Wp.

Figure 3:
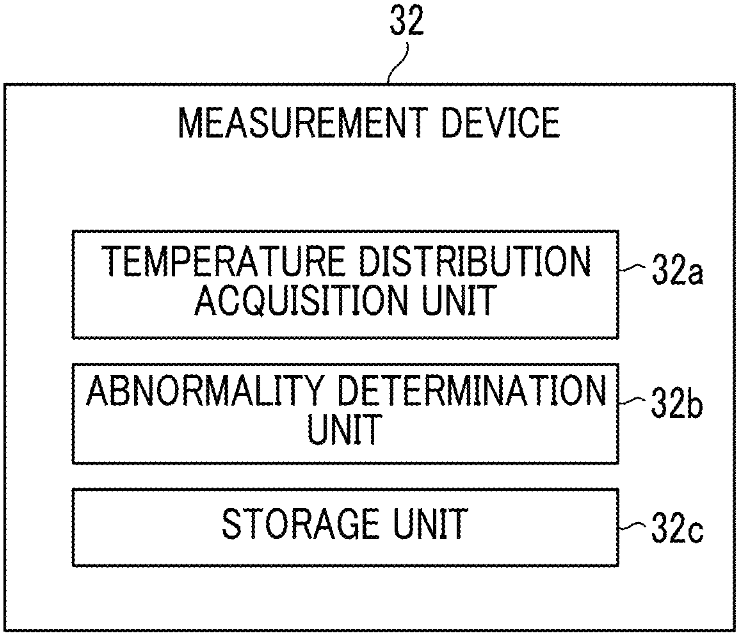
FIG. 3 is a functional block diagram of a measurement device according to the embodiment of the present disclosure.

As shown in FIG. 3, the measurement device 32 includes a temperature distribution acquisition unit 32*a*, an anomaly determination unit 32*b*, and a storage unit 32*c*.

The temperature distribution acquisition unit 32*a* acquires the temperature distribution image acquired by the infrared camera 31.

The anomaly determination unit 32*b* determines whether or not there is an anomaly in the temperature distribution of the surface Ws1 of the component W, based on the temperature distribution image acquired by the temperature distribution acquisition unit 32*a*.

For example, the anomaly determination unit 32*b* compares a sample image showing an ideal temperature distribution on the surface Ws1 of the component W stored in advance in the storage unit 32*c* with the acquired temperature distribution image. Specifically, for example, the anomaly determination unit 32*b* takes a difference between a temperature based on a radiation brightness in each pixel of the temperature distribution image and a temperature based on a radiation brightness in each pixel of the sample image. The anomaly determination unit 32*b* determines that there is an anomaly in a case where the difference exceeds a predetermined threshold value, and determines that there is an anomaly in the cooling flow passage Wp corresponding to the pixels in the image exceeding the threshold value.

Figure 4:
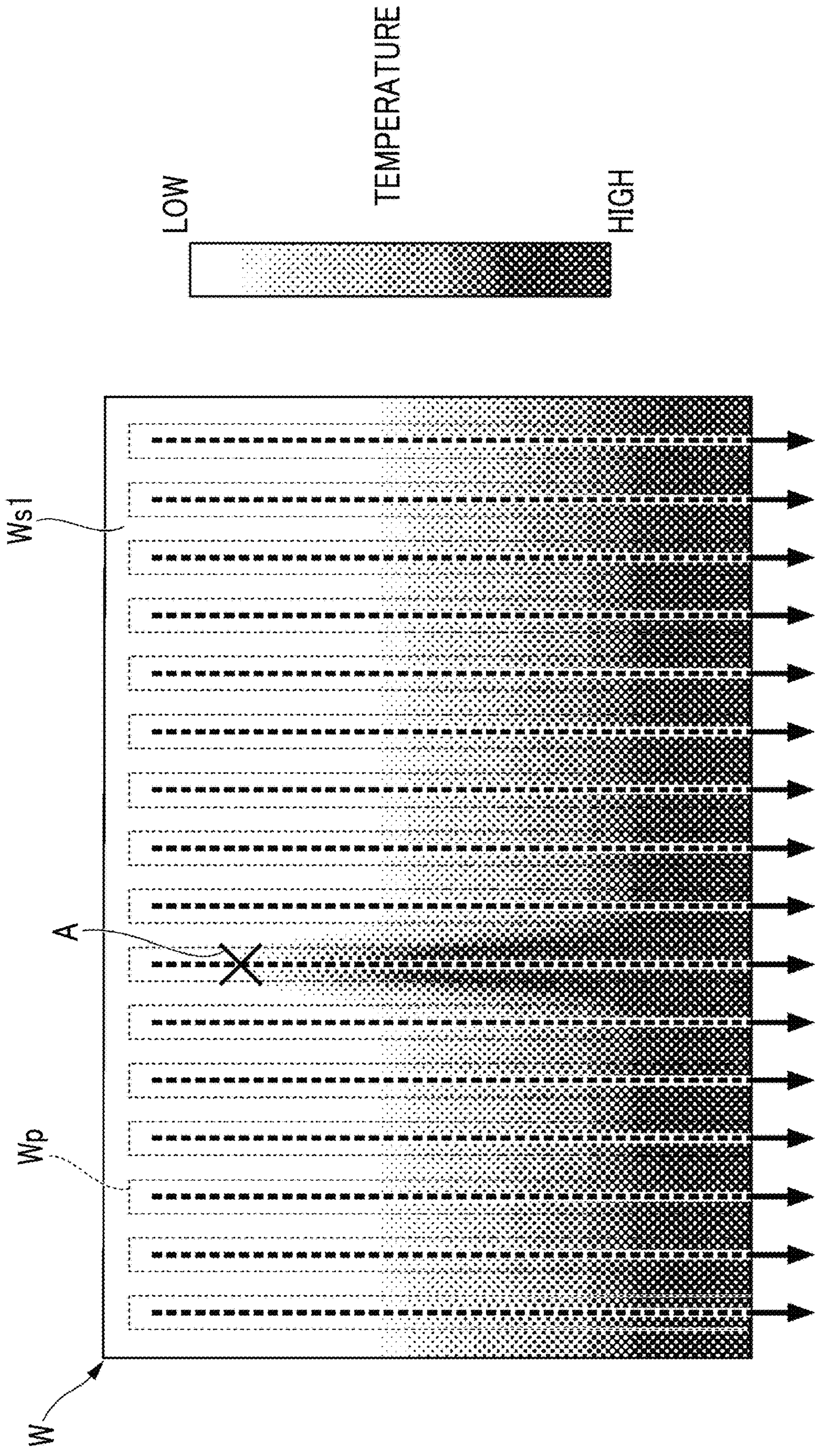
FIG. 4 is an image diagram showing a temperature distribution of a surface of a component in a case where there is an anomaly in a cooling flow passage of the component according to the embodiment of the present disclosure.

Here, for example, as shown in FIG. 4, in a case where there is an anomaly in the cooling flow passage Wp in the component W, an unnatural (irregular) temperature distribution occurs with a specific location A in the temperature distribution image as a base point. In this case, a difference between the temperature at the specific location A in the temperature distribution image and the temperature at the location corresponding to the specific location A in the sample image exceeds the predetermined threshold value.

(Component Manufacturing Method)

Hereinafter, a manufacturing method of the component W in the present embodiment will be described.

Figure 5:
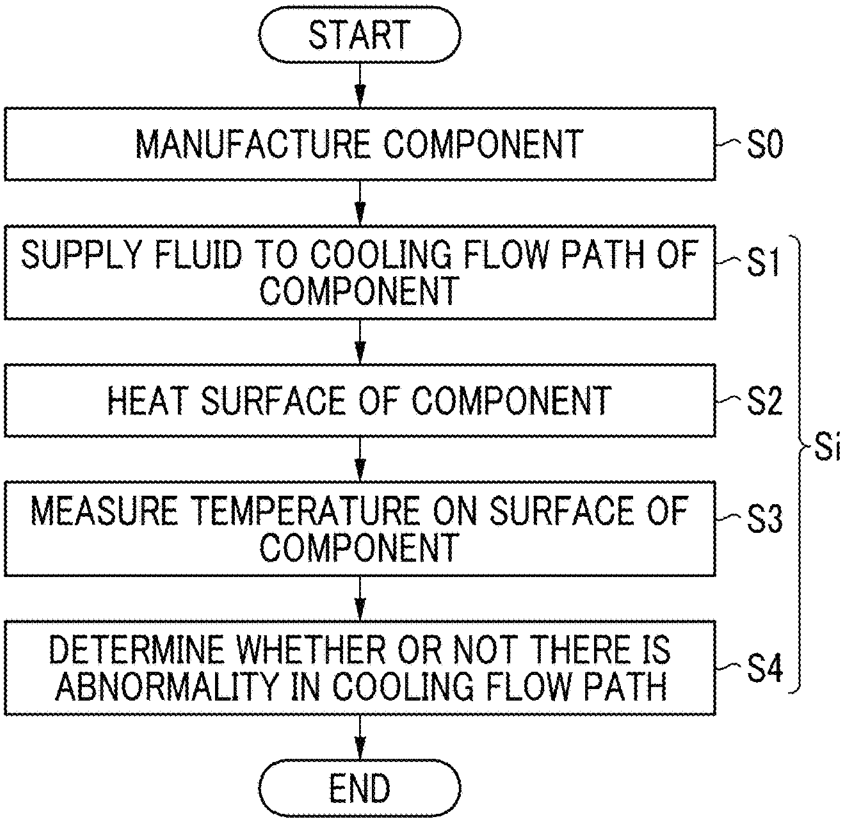
FIG. 5 is a flowchart showing a component manufacturing method according to the embodiment of the present disclosure.

As shown in FIG. 5, the manufacturing method of the component W includes a manufacturing step S0 and an inspection method Si of the component W.

(Manufacturing Step)

In the manufacturing step S0, the component W having the cooling flow passage Wp therein is manufactured. Specifically, the component W is manufactured by additive manufacturing (AM) or the like using a 3D printer.

(Component Inspection Method)

The inspection method Si of the component W includes a fluid supply step S1, a heating step S2, a measurement step S3, and a determination step S4.

In the fluid supply step S1, the fluid F is supplied to the cooling flow passage Wp formed inside the component W. Specifically, by driving the compressor 12, the fluid F continues to flow through the cooling flow passage Wp of the component W.

In the heating step S2, the surface Ws1 of the component W is heated after the fluid supply step S1. Specifically, by driving the heating lamp 21, the component W is irradiated with the irradiation light L, and the surface Ws1 of the component W is heated.

In the measurement step S3, the temperature on the surface Ws1 of the component W heated in the heating step S2 is measured. Specifically, the infrared camera 31 acquires a temperature distribution image of the surface Ws1 of the component W, and the measurement device 32 measures the temperature distribution of the surface Ws1 of the component W based on the temperature distribution image.

In the determination step S4, it is determined whether or not there is an anomaly in the cooling flow passage Wp, based on the temperature distribution image measured in the measurement step S3. Specifically, the measurement device 32 determines whether or not there is an anomaly in the temperature distribution image using the sample image.

Through the above steps, the component W is manufactured for which the inspection of whether or not there is an anomaly in the cooling flow passage Wp is completed.

(Operation Effects)

In the inspection method Si of the component W according to the above-described embodiment, the surface Ws1 of the heated component W is measured while the fluid F is supplied to the cooling flow passage Wp. Accordingly, since the temperature on the surface Ws1 of the component W cooled by the fluid F can be measured, in a case where there is an anomaly in the cooling flow passage Wp, it is possible to find an anomaly in the temperature on the surface Ws1 of the component W, which is caused by the anomaly. Therefore, it is possible to find the anomaly in the cooling flow passage Wp formed inside the component W.

In addition, in the inspection method Si of the component W according to the above-described embodiment, in order to determine whether or not there is an anomaly in the cooling flow passage Wp based on the measured temperature on the surface Ws1 of the component W, it is not necessary to directly measure the temperature in the cooling flow passage Wp. That is, it is possible to indirectly determine whether or not there is an anomaly in the cooling flow passage Wp by measuring the temperature on the surface Ws1 of the component W. Therefore, since a jig or the like is not used when inspecting the inside of the cooling flow passage Wp of the component W, it is possible to inspect whether or not there is an anomaly in the cooling flow passage Wp via a simple method.

In addition, in the inspection method Si of the component W according to the above-described embodiment, since the component W is a high-temperature component for a gas turbine, it is possible to obtain a high-temperature component for a gas turbine in which it is ensured that there is no anomaly in the cooling flow passage Wp.

In addition, in the inspection method Si of the component W according to the above-described embodiment, the surface Ws1 of the component W is heated using the irradiation light L of the heating lamp 21, and the temperature distribution of the surface Ws1 of the component W is measured using the infrared camera 31. Accordingly, the above-mentioned operation effects can be achieved with a specific configuration.

In addition, in the inspection method Si of the component W according to the above-described embodiment, since the wavelength bandwidth to be detected by the infrared camera 31 is larger than the wavelength at which the spectral energy of the irradiation light L peaks, it is possible to prevent the infrared camera 31 from directly receiving an influence of heat from the irradiation light L. Therefore, it is possible to suppress deterioration in measurement accuracy when measuring the temperature on the surface Ws1 of the component W.

In addition, in the inspection method Si of the component W according to the above-described embodiment, since the filter 22 cuts the wavelength in the wavelength bandwidth to be detected by the infrared camera 31 in the irradiation light L, it is possible to further prevent the infrared camera 31 from directly receiving the influence of heat from the irradiation light L. Therefore, it is possible to further suppress deterioration in the measurement accuracy when measuring the temperature on the surface Ws1 of the component W.

Other Embodiments

Hitherto, the embodiments of the present disclosure have been described in detail with reference to the drawings. However, specific configurations are not limited to the configurations of each embodiment, and additions, omissions, and substitutions of configurations and other modifications can be made within the scope not departing from the concept of the present disclosure. Further, the present disclosure is not limited by the embodiments, and is limited only by the claims.

Figure 6:
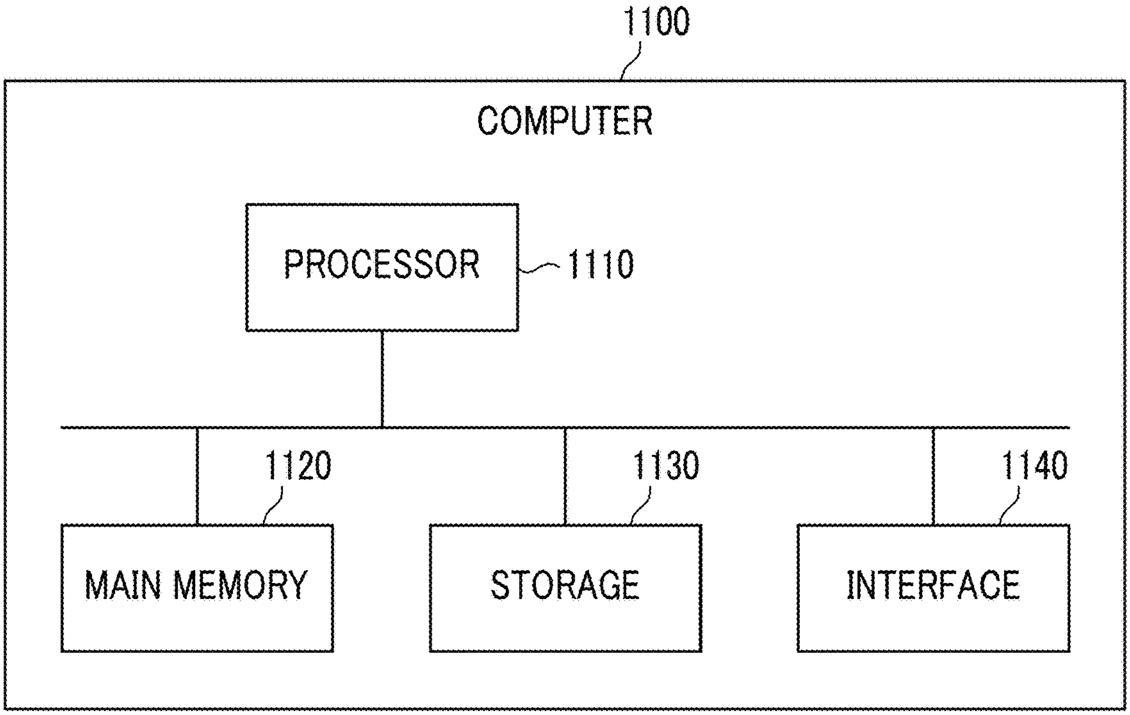
FIG. 6 is a hardware configuration diagram of a computer according to the embodiment of the present disclosure.

FIG. 6 is a hardware configuration diagram illustrating a configuration of a computer 1100 according to the present embodiment.

A computer 1100 includes a processor 1110, a main memory 1120, a storage 1130, and an interface 1140.

The above-described measurement device 32 is mounted on the computer 1100. An operation of each of the processing units described above is stored in the storage 1130 in a form of a program. The processor 1110 reads the program from the storage 1130, develops the read program in the main memory 1120, and executes the above-described process in accordance with the program. In addition, the processor 1110 secures a storage area corresponding to each storage unit 32*c* described above in the main memory 1120 in accordance with the program.

The program may be a program for realizing some of functions exhibited by the computer 1100. For example, the program may exhibit the function in combination with another program already stored in the storage 1130 or in combination with another program implemented on another device. In addition, the computer 1100 may include a custom large scale integrated circuit (LSI) such as a programmable logic device (PLD) in addition to or in place of the above configuration. Examples of the PLDs include a programmable array logic (PAL), a generic array logic (GAL), a complex programmable logic device (CPLD), and a field-programmable gate array (FPGA). In this case, some or all of the functions realized by the processor 1110 may be realized by the integrated circuit.

As an example of the storage 1130, a magnetic disk, a magneto-optical disk, or a semiconductor memory can be used. The storage 1130 may be an internal medium directly connected to a bus of the computer 1100 or may be an external medium connected to the computer 1100 through the interface 1140 or a communication line. In addition, when this program is distributed to the computer 1100 via the communication line, the computer 1100 receiving the distributed program may deploy the program in the main memory 1120 to execute the above-described process. In the above-described embodiment, the storage 1130 is a non-transitory tangible storage medium.

In addition, the program may be a program for realizing some of the above-described functions. In addition, the program may be a so-called difference file (difference program) that realizes the above-described functions in combination with another program previously stored in the storage 1130.

In addition, the manufacturing step S0 of the above-described embodiment may include a coating film forming process in which a coating film (coating agent) having a higher radiation characteristic than that of the surface Ws1 of the component W is formed on the surface Ws1 of the component W. Specifically, in the coating film forming process, a black coating material or the like is employed as the coating film.

As a result, the heating lamp 21 of the heating unit 20 can effectively heat the surface Ws1 of the component W, so that the infrared camera 31 of the measurement unit 30 can acquire a clearer temperature distribution image.

Therefore, the determination unit can determine whether or not there is an anomaly in the cooling flow passage Wp with higher accuracy. The coating film employed in the coating film forming process may not be formed of the black coating material. That is, the color of the coating material forming the coating film is not limited.

In addition, in the inspection method Si of the component W according to the above-described embodiment, the heating step S2 of heating the surface Ws1 of the component W is executed after the fluid supply step S1. However, the present disclosure is not limited to this order, and the fluid supply step S1 may be executed after the heating step S2.

In addition, the measurement device 32 of the measurement unit 30 in the above-described embodiment may further include a temperature distribution display unit that displays the temperature distribution image acquired by the infrared camera 31. At this time, for example, the temperature distribution image displayed by the temperature distribution display unit may be visually compared with a limit sample or the like by an operator, and the operator may determine whether or not there is an anomaly in the cooling flow passage Wp of the component W.

Further, in the above-described embodiment, the component W is placed on the chamber 11 such that the surface Ws1 faces the upper side in the vertical direction Dv; however, the present disclosure is not limited to this configuration. For example, the component W may be fixed to the chamber 11 in a state where the surface Ws1 is inclined with respect to the horizontal direction or in a state where the surface Ws1 faces a sideways direction.

In addition, the filter 22 in the above-described embodiment may not be formed in a flat plate shape. The filter 22 may have a disk shape or the like. Further, the areas of the first surface 22*a* and the second surface 22*b* of the filter 22 may be formed to have the same size as the area of the surface Ws1 of the component W. In addition, it is more preferable that a thickness of the filter 22 in the vertical direction Dv is 20 mm to 30 mm.

In addition, the component W in the above-described embodiment may not be formed by additive manufacturing (AM). The component W may be formed, for example, by casting using a mold. Further, the cooling flow passage Wp of the component W may be formed by performing a discharging process or the like.

Further, although the measurement device 32 in the above-described embodiment is connected to the infrared camera 31 via a cable or the like, the present disclosure is not limited to this configuration, and the measurement device 32 and the infrared camera 31 may be wirelessly connected to each other.

In addition, the anomaly determination unit 32*b* in the above-described embodiment takes the difference between the temperature based on the radiation brightness in each pixel of the temperature distribution image and the temperature based on the radiation brightness in each pixel of the sample image; however, the present disclosure is not limited to this configuration.

The temperature distribution image and the sample image are each divided into a plurality of meshes (regions), and the anomaly determination unit 32*b* may perform a comparison by taking a difference between the data obtained by statistical processing or the like with respect to the temperatures of each of a plurality of pixels included in each mesh.

At that time, the anomaly determination unit 32*b* compares the data of the corresponding meshes in the temperature distribution image and the sample image with each other. In this case, the anomaly determination unit 32*b* may determine that there is an anomaly in a case where the difference exceeds a predetermined threshold value, and determine that there is an anomaly in the region of the cooling flow passage Wp corresponding to the mesh in the image that exceeds the threshold value.

In addition, in the embodiment, the ring segment having the cooling flow passage Wp therein as the component has been described as an example; however, the present disclosure is not limited to the ring segment. The component W may be the vane body of the stator vane or the rotor vane as the gas turbine vane. The vane body has a vane shape in cross section and has a cooling flow passage Wp therein through which the fluid F can flow. The surface Ws1 to be inspected is, for example, a positive pressure surface (ventral side surface) as a concave curved surface connecting a leading edge and a trailing edge, or a negative pressure surface (back side surface) as a convex curved surface.

Further, the component W may be a shroud of the stator vane or of the rotor vane as the gas turbine vane. The shroud has a cooling flow passage Wp inside thereof through which the fluid F can flow. Further, the component W may be a platform of the rotor vane that is the gas turbine vane. The platform has a cooling flow passage Wp inside thereof through which the fluid F can flow. In a case where the shroud or the platform is the component W, the surface Ws1 to be inspected is, for example, a gas path surface.

Further, the component W may be a heat shield ring having a cooling flow passage Wp therein.

Further, the component W may be a transition piece for a combustor having a cooling flow passage Wp therein.

Further, the component W is not limited to the high-temperature component for a gas turbine included in the gas turbine. The component W may be, for example, a high-temperature component for a rotary machine that has a cooling flow passage Wp inside thereof through which a cooling fluid F can flow, among components included in another rotary machine such as a steam turbine or a compressor.

APPENDIX

The component inspection method, the component manufacturing method, and the component inspection device described in the embodiments are, for example, as follows.

(1) An inspection method Si of a component W according to a first aspect includes a fluid supply step S1 of supplying a fluid F to a cooling flow passage Wp of a component W having the cooling flow passage Wp therein, a heating step S2 of heating a surface Ws1 of the component W, and a measurement step S3 of measuring a temperature on the surface Ws1 of the component W heated in the heating step S2.

Accordingly, since the temperature on the surface Ws1 of the component W cooled by the fluid F can be measured, in a case where there is an anomaly in the cooling flow passage Wp, it is possible to find an anomaly in the temperature on the surface Ws1 of the component W, which is caused by the anomaly.

(2) The inspection method Si of the component W according to a second aspect is the inspection method Si of the component W according to (1), and may further include a determination step S4 of determining whether or not there is an anomaly in the cooling flow passage Wp based on the temperature measured in the measurement step S3.

Accordingly, it is not necessary to directly measure the temperature in the cooling flow passage Wp. That is, it is possible to indirectly determine whether or not there is an anomaly in the cooling flow passage Wp by measuring the temperature on the surface Ws1 of the component W.

(3) The inspection method Si of the component W according to a third aspect is the inspection method Si of the component W according to (1) or (2), in which the component W may be a high-temperature component for a rotary machine.

Accordingly, it is possible to obtain the high-temperature component for a rotary machine in which it is ensured that there is no anomaly in the cooling flow passage Wp.

(4) The inspection method Si of the component W according to a fourth aspect is the inspection method Si of the component W according to (3), in which the high-temperature component for a rotary machine may be a high-temperature component for a gas turbine.

Accordingly, it is possible to obtain the high-temperature component for a gas turbine in which it is ensured that there is no anomaly in the cooling flow passage Wp.

(5) The inspection method Si of the component W according to a fifth aspect is the inspection method Si of the component W according to any one of (1) to (4), in which in the heating step S2, the surface Ws1 of the component W may be heated using irradiation light L of a heating lamp 21, and in the measurement step S3, temperature distribution on the surface Ws1 may be measured using an infrared camera 31.

Accordingly, the above-mentioned operation effects can be achieved with a specific configuration.

(6) The inspection method Si of the component W according to a sixth aspect is the inspection method Si of the component W according to (5), in which a wavelength bandwidth to be detected by the infrared camera 31 may be larger than a wavelength at which spectral energy of the irradiation light L of the heating lamp 21 reaches a peak P.

As a result, it is possible to prevent the infrared camera 31 from directly receiving the influence of heat from the irradiation light L.

(7) The inspection method Si of the component W according to a seventh aspect is the inspection method Si of the component W according to (6), in which in the heating step S2, a filter 22 that cuts a wavelength in the wavelength bandwidth to be detected by the infrared camera 31 in the irradiation light L of the heating lamp 21 may be used.

As a result, it is possible to further prevent the infrared camera 31 from directly receiving the influence of heat from the irradiation light L.

(8) The inspection method Si of the component W according to an eighth aspect is the inspection method Si of the component W according to any one of (5) to (7), in which a coating film having a higher radiation characteristic than the surface Ws1 of the component W may be formed on the surface Ws1 of the component W.

As a result, the heating lamp 21 of the heating unit 20 can effectively heat the surface Ws1 of the component W, so that the infrared camera 31 of the measurement unit 30 can acquire a clearer temperature distribution image.

(9) A manufacturing method of a component according to a ninth aspect includes a manufacturing step S0 of manufacturing a component W having a cooling flow passage Wp therein, and the inspection method Si of the component W according to any one of (1) to (8) for inspecting the component manufactured in the manufacturing step S0.

(10) An inspection device 1 of a component W according to a tenth aspect includes a fluid supply unit 10 that supplies a fluid F to a cooling flow passage Wp of a component W having the cooling flow passage Wp therein, a heating unit 20 that heats a surface Ws1 of the component W, and a measurement unit 30 that measures a temperature on the surface Ws1 of the component W heated by the heating unit 20.

INDUSTRIAL APPLICABILITY

According to the present disclosure, it is possible to provide a component inspection method, a component manufacturing method, and a component inspection device capable of finding an anomaly in a cooling flow passage formed inside a component.

REFERENCE SIGNS LIST

1: inspection device
10: fluid supply unit
11: chamber
11*a*: component support portion
11*b*: hole portion
12: compressor
13: supply line
14: valve
20: heating unit
21: heating lamp
22: filter
22*a*: first surface
22*b*: second surface
30: measurement unit
31: infrared camera
32: measurement device
32*a*: temperature distribution acquisition unit
32*b*: anomaly determination unit
32*c*: storage unit
1100: computer
1110: processor
1120: main memory
1130: storage
1140: interface
A: specific location
Di: irradiation direction
Dv: vertical direction
F: fluid
L: irradiation light
P: peak
R: supply space
S0: manufacturing step
S1: fluid supply step
S2: heating step
S3: measurement step
S4: determination step
Si: inspection method
W: component
Wp: cooling flow passage
Wp1: fluid inlet portion
Wp2: intermediate portion
Wp3: fluid outlet portion
Ws1: surface
Ws2: non-inspection surface

The invention claimed is:

1. A component inspection method comprising:

supplying, by a fluid supply unit, a fluid to a cooling flow passage of a component having the cooling flow passage therein;

heating, by a heating unit, a surface of the component while supplying the fluid to the cooling flow passage by the fluid supply unit; and measuring, by a measuring unit, a temperature on the surface of the component which has been heated.

2. The component inspection method according to claim 1, further comprising:

determining, by a determination unit, whether or not an anomaly is present in the cooling flow passage based on the temperature which has been measured.

3. The component inspection method according to claim 1, wherein the component is a high-temperature component for a rotary machine.

4. The component inspection method according to claim 3, wherein the rotary machine includes a gas turbine, and the high-temperature component is for the gas turbine.

5. The component inspection method according to claim 1, wherein:

to heat the surface of the component, the heating unit uses irradiation light of a heating lamp; and to measure the temperature, the measurement unit uses an infrared camera to measure a temperature distribution on the surface of the component which has been heated.

6. The component inspection method according to claim 5, wherein a wavelength bandwidth to be detected by the infrared camera is larger than a wavelength at which spectral energy of the irradiation light of the heating lamp peaks.

7. The component inspection method according to claim 6, wherein, to heat the surface of the component, the heating unit uses a filter which cuts a wavelength in the wavelength bandwidth to be detected by the infrared camera in the irradiation light of the heating lamp.

8. The component inspection method according to claim 5, wherein a coating film is on the surface of the component, and the coating film has a higher radiation characteristic than the surface of the component.

9. A component manufacturing method comprising:

manufacturing, by a manufacturing unit, a component having a cooling flow passage therein; and inspecting, by a component inspection device, the component using the component inspection method according to claim 1.

10. A component inspection device comprising:

a fluid supply unit configured to supply a fluid to a cooling flow passage of a component having the cooling flow passage therein;

a heating unit configured to heat a surface of the component; and a measurement unit configured to measure a temperature on the surface of the component which has been heated, wherein the heating unit is configured to heat the surface of the component while the fluid supply unit supplies the fluid to the cooling flow passage.

* * * * *